United States Patent
Nanda et al.

(10) Patent No.: US 11,567,721 B2
(45) Date of Patent: Jan. 31, 2023

(54) DETERMINING SUITABLE VALUES OF PARAMETERS CONTROLLING DISPLAY CHARACTERISTICS OF ELEMENTS OF INTERACTIVE PAGES

(71) Applicant: Oracle International Corporation, Redwood Shores, CA (US)

(72) Inventors: Sambit Nanda, Bangalore (IN); Mandeep Singh, Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 529 days.

(21) Appl. No.: 14/729,099

(22) Filed: Jun. 3, 2015

(65) Prior Publication Data
US 2016/0357419 A1    Dec. 8, 2016

(51) Int. Cl.
*G06F 3/0484* (2022.01)
*G06F 3/14* (2006.01)
(Continued)

(52) U.S. Cl.
CPC .......... *G06F 3/1415* (2013.01); *G06F 3/0488* (2013.01); *G06F 3/04842* (2013.01);
(Continued)

(58) Field of Classification Search
CPC .. G06F 3/04847; G06F 3/0482; G06F 3/0481; G06F 17/211; G06F 17/212; G06F 17/25; G06F 17/30867; G06F 17/2294; G06F 17/246; G06F 3/1415; G06F 3/04842; G06F 3/0488; G06F 16/9577;
(Continued)

(56) References Cited

U.S. PATENT DOCUMENTS

| 6,414,698 B1 * | 7/2002 | Lovell .................. G06F 9/4443 345/472 |
| 7,337,393 B2 | 2/2008 | Chartier et al. |

(Continued)

OTHER PUBLICATIONS

CSS Box Model, http://www.w3schools.com/css/css_boxmodel.asp, downloaded circa Nov. 4, 2014, pp. 1-2.
(Continued)

*Primary Examiner* — Cesar B Paula
*Assistant Examiner* — Carl E Barnes, Jr.
(74) *Attorney, Agent, or Firm* — IPhorizons PLLC; Narendra Reddy Thappeta

(57) ABSTRACT

An aspect of the present disclosure provides for customizing electronic page display based on user interactions. In an embodiment, a web page is displayed in response to a first request. The selection points on the web page are received, and new values are computed for the parameters defining the display characteristics of some of the interactive elements based on the selection points received on the displayed web page. The web page is thereafter sent for display based on the new value for such interactive elements. In one embodiment, the new value corresponds to a width or height parameter, and the size of a first element is increased upon mis-selections found associated with the first element. In another embodiment, the new value corresponds to an inter-element distance between a pair of elements, when mis-selections are found associated with one of the pair of elements.

16 Claims, 11 Drawing Sheets

(51) Int. Cl.
*G06F 3/0482* (2013.01)
*G06F 3/04842* (2022.01)
*G06F 16/957* (2019.01)
*G06F 3/0488* (2022.01)
*G06F 40/103* (2020.01)

(52) U.S. Cl.
CPC ........ *G06F 16/9577* (2019.01); *G06F 40/103* (2020.01); *G09G 2340/0407* (2013.01); *G09G 2354/00* (2013.01); *G09G 2370/022* (2013.01); *G09G 2370/027* (2013.01)

(58) Field of Classification Search
CPC .......... G06F 40/103; G09G 2340/0407; G09G 2370/022; G09G 2370/027; G09G 2354/00
See application file for complete search history.

(56) References Cited

U.S. PATENT DOCUMENTS

| | | | |
|---|---|---|---|
| 7,385,592 B2 * | 6/2008 | Collins | G06F 3/0482 345/173 |
| 8,127,221 B2 | 2/2012 | Vaschillo et al. | |
| 8,700,992 B1 | 4/2014 | Sedov | |
| 10,719,206 B1 * | 7/2020 | Bura | G06F 40/143 |
| 2003/0025737 A1 * | 2/2003 | Breinberg | G06F 8/38 715/801 |
| 2005/0144555 A1 | 6/2005 | Morris | |
| 2005/0225540 A1 * | 10/2005 | Kawakami | G06F 3/04886 345/173 |
| 2008/0228910 A1 | 9/2008 | Petri | |
| 2009/0128505 A1 * | 5/2009 | Partridge | G06F 3/04883 345/173 |
| 2011/0078613 A1 * | 3/2011 | Bangalore | G06F 3/04886 715/773 |
| 2011/0138329 A1 * | 6/2011 | Wells | G06F 3/0482 715/830 |
| 2011/0145759 A1 * | 6/2011 | Leffert | G06F 3/04845 715/800 |
| 2011/0267278 A1 * | 11/2011 | Wickstrom | G06F 3/04886 345/173 |
| 2013/0120273 A1 * | 5/2013 | Choi | G06F 3/023 345/168 |
| 2013/0222247 A1 * | 8/2013 | Liu | G06F 3/0418 345/168 |
| 2013/0305187 A1 * | 11/2013 | Phillips | G06F 3/04817 715/800 |
| 2013/0328788 A1 * | 12/2013 | Wibbeler | G06F 3/0488 345/173 |
| 2014/0075283 A1 | 3/2014 | Coursol | |
| 2014/0098069 A1 * | 4/2014 | Tseng | G06F 3/0418 345/178 |
| 2014/0149884 A1 * | 5/2014 | Flynn, III | G06F 3/0488 715/752 |
| 2014/0108915 A1 | 8/2014 | Lu et al. | |
| 2014/0372947 A1 * | 12/2014 | Hill | G06F 3/0482 715/815 |
| 2016/0085440 A1 * | 3/2016 | Canoy | G06F 3/04886 715/773 |

OTHER PUBLICATIONS

Designing for iOS, https://developer.apple.com/library/ios/documentation/userexperience/conceptual/mobilehig/, downloaded circa Nov. 3, 2014, pp. 1-5.

DigitaHive Website Design, http://www.digitalhive.co.za/web-design/, downloaded circa Nov. 4, 2014, pp. 1-9.

\* cited by examiner

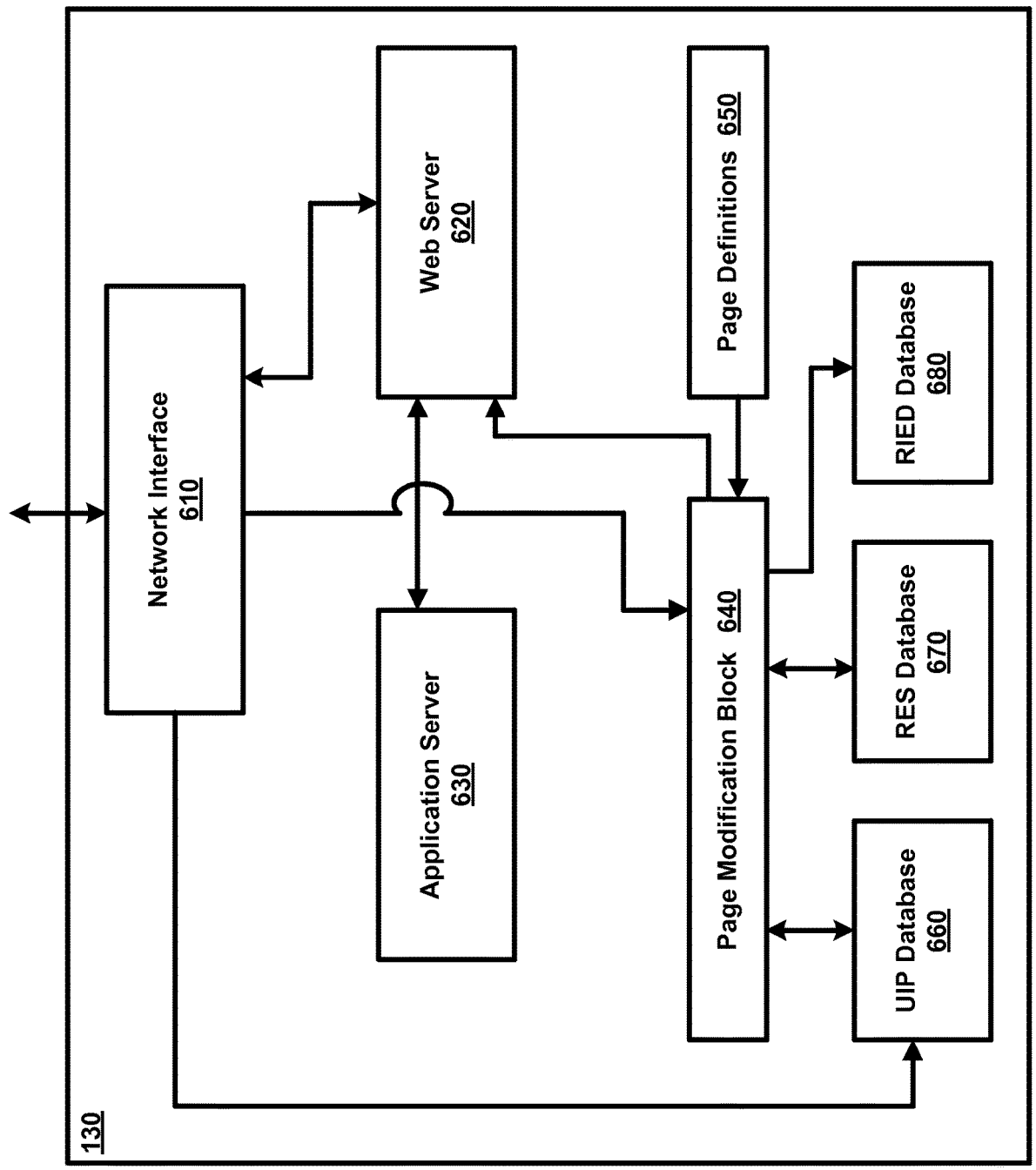

User Interactivity Profile (UIP) Database

| Row ID | Web page name | User-id | Screen size | Timestamp | Data |
|---|---|---|---|---|---|
| 1 | results.html | 23274 | extra small (width < 768px) | [TS1] | [Object] |
| 2 | queries.html | 28747 | extra small (width < 768px) | [TS1] | [Object] |
| 3 | contactus.html | 23274 | medium (772px <= width < 1200px) | [TS2] | [Object] |
| 4 | contactus.html | 23274 | large (1200px <= width) | [TS3] | [Object] |
| 5 | contactus.html | 23274 | large (1200px <= width) | [TS4] | [Object] |

*FIG. 7A*

```
780: "element-size-quality":
781:    [
785:    {"id": se4, "seb": 2 2 2 2, "vezbp": 1 1 1 1, "gc": 20, "bc": 100, "adc": 1}
788:    ],
789: "inter-element distance quality":
790:    [
792:    {"element-set": se2 se3, "seb-set": 2 2, "inter-elem-dist": 5},
796:    ]
```

*FIG. 7B*

DETERMINING SUITABLE VALUES OF PARAMETERS CONTROLLING DISPLAY CHARACTERISTICS OF ELEMENTS OF INTERACTIVE PAGES

BACKGROUND

Technical Field

The present disclosure relates to web-enabled applications, and more specifically to determining suitable values of parameters controlling display characteristics of elements of interactive pages.

Related Art

Electronic pages are displayed on display screens of computer systems, and include web pages transmitted over networks for display using browsers or custom mobile applications, etc. An electronic page is said to be an interactive page when it is used for seeking inputs from users after displaying relevant information on a display screen (or computer screen). Applications may process the user input data to provide a corresponding utility for the users.

Each interactive page is defined to contain at least one element which the user can interact with, using touch, click, and other such similar user interactions. Thus, an element may be defined as any sub-part of an interactive page that facilitates user interactions. Examples of elements include HTML (Hypertext Markup Language) input elements (button, input, text-area, etc.) and HTML elements which have an event listener associated with them (e.g., clickable elements, touch-enabled elements, etc.). Since elements facilitate user interaction, they may also be referred to as interactive elements.

Display characteristics refer to the characteristics of elements perceived by the human eye, and include aspects such as size, color, and location on the page. The specification of a page (e.g., HTML specification of web pages) contains parameters, with associated values, which control the display characteristics when the corresponding page is rendered on a display screen. For example, the specification may contain height and width parameters for an element, with the corresponding values determining the size of the element on the display. For a color parameter, the values of Red, Green and Blue component may be specified in the page specification.

It may thus be appreciated that appropriate values of parameters may be required for display characteristics that provide for user-friendly interactions with pages. Aspects of the present disclosure relate to determining suitable values of parameters controlling display characteristics of elements of interactive pages.

BRIEF DESCRIPTION OF THE DRAWINGS

Example embodiments of the present disclosure are described with reference to the accompanying drawings briefly described below.

FIG. 6 is a block diagram illustrating the detailed architecture of a server system, in an embodiment.

FIG. 7A illustrates the manner in which a user profile database is maintained on server system, in an embodiment.

FIG. 7B illustrates an example of monitored data stored for a user, in an embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

An aspect of the present disclosure provides for customizing display of electronic pages (e.g., web pages) based on user interactions. In an embodiment, a web page is displayed in response to a first request. The selection points on the web page are received, and new values are computed for the parameters defining the display characteristics of some of the interactive elements based on the selection points received on the displayed web page. The web page is thereafter sent for display based on the new value for such interactive elements.

In one embodiment, the new value corresponds to a width or height parameter, and the size of a first element is increased upon mis-selections found associated with the first element. A mis-selection is counted when a selection point falls within a padded area surrounding the element area constituting the displayed element.

In another embodiment, the new value corresponds to an inter-element distance between a pair of elements, when mis-selections are found associated with one of the pair of elements. According to an aspect, the inter-element distance is increased as the size of one of the elements of the pair is increased.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

Figure 1:
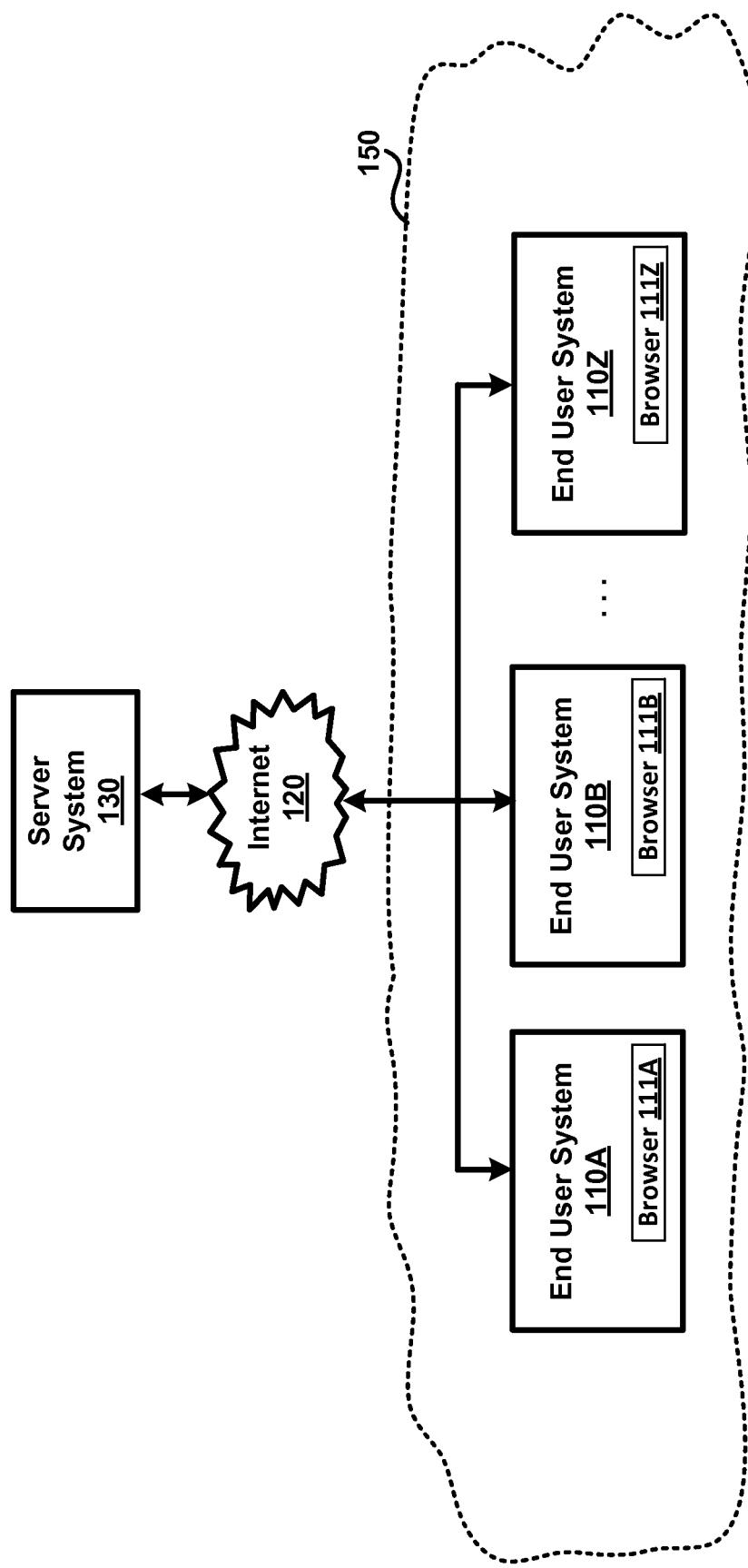
FIG. 1 is a block diagram illustrating an example environment in which several aspects of the present disclosure can be implemented.

FIG. 1 is a block diagram illustrating an example environment in which several aspects of the present disclosure can be implemented. The block diagram is shown containing end user systems 110A-110Z, Internet 120, and server system 130.

Merely for illustration, only representative number/types of systems are shown in the Figure. Many environments often contain many more systems, both in number and type, depending on the purpose for which the environment is designed. Each system/device of FIG. 1 is described below in further detail.

Internet 120 provides connectivity of end user systems 110A-110Z (and other systems of the enterprise site 150) with external systems such as server system 130. Internet 120 may be implemented using protocols such as Transmission Control Protocol (TCP) and/or Internet Protocol (IP), well known in the relevant arts. In general, in TCP/IP environments, an IP packet is used as a basic unit of transport, with the source address being set to the IP address assigned to the source system from which the packet originates and the destination address set to the IP address of the destination system to which the packet is to be eventually delivered.

An IP packet is said to be directed to a destination system when the destination IP address of the packet is set to the IP address of the destination system, such that the packet is eventually delivered to the destination system by Internet 120. When the packet contains content such as port numbers, which specifies the destination application, the packet may be said to be directed to such application as well. The destination system may be required to keep the corresponding port numbers available/open, and process the packets with the corresponding destination ports. Internet 120 may be implemented using any combination of wire-based or wireless mediums.

Server system 130 represents a server, which hosts applications that may be used by users using end user systems 110A-110Z. The applications cause interactive pages to be served to users, and receive inputs provided by the users. In embodiments described below, interactive pages are rendered by browser software at the end user systems for interaction with corresponding users. Alternately, interactive pages may be served by mobile applications and rendered by appropriate alternative software at the end user systems.

Each of end user systems 110A-110Z in the enterprise (i.e., enterprise site 150 shown with dotted boundaries) represents a system such as a personal computer, workstation, mobile station, mobile phones, computing tablets, etc. Using appropriate user interfaces (e.g., those provided via browsers 111A-111Z) of end user systems 110A-110Z, users access applications hosted on the server system 130.

In a typical implementation, server system 130 hosts applications that serve interactive pages. One or more of these applications are accessed by users on end user systems 110A-110Z using appropriate user interfaces. Thereafter, the interactive pages are displayed to the users on end user systems 110A-110Z via corresponding display screens.

Although end user systems 110A-110Z are respectively shown containing browsers 111A-111Z via which user interfaces are provided, when the end user systems correspond to mobile devices (e.g., mobile phones, tablets etc.), and the applications accessed are mobile applications, software that offers similar functionality as browsers 111A-111Z (i.e., software that facilitates accessing mobile applications, and viewing/processing of interactive pages, for example) is implemented in the end user systems 110A-110Z (corresponding to mobile phones, etc.) in cooperation with the mobile applications implemented on server system 130, as will be apparent to one skilled in the relevant arts by reading the disclosure provided herein. Therefore, browsers 111A-111Z may be said to represent all such software as suited in the corresponding implementation.

Aspects of the present disclosure provide for displaying interactive pages with suitable display characteristics, as described below with examples.

3. Flowchart

Figure 2:
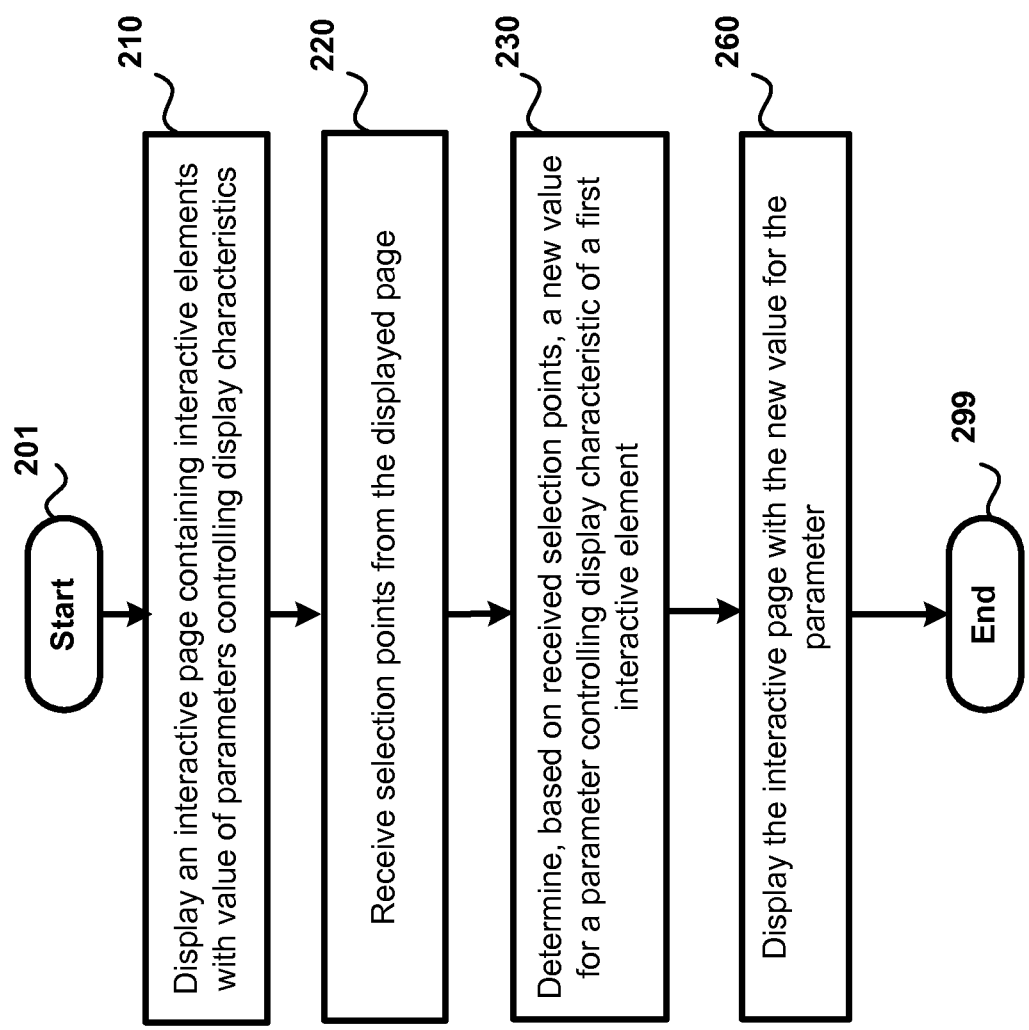
FIG. 2 is a flow chart illustrating the manner in which interactive pages are displayed with suitable display characteristics, according to an aspect of the present disclosure.

FIG. 2 is a flow chart illustrating the manner in which interactive pages are displayed with suitable display characteristics, according to an aspect of the present disclosure. The flowchart is described with respect to the systems of FIG. 1 merely for illustration. However, many of the features can be implemented in other systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 201, in which control immediately passes to step 210.

In step 210, end user system 110A displays an interactive page containing interactive elements. The display is generated based on a page specification received from server system 130. The values (in the specification) associated with parameters of the interactive elements control the display characteristics of such interactive elements. In the case of web pages, the interactive elements correspond to HTML input elements, such as a button, or elements which have an event listener associated with them, such as clickable or touch-enabled image etc. In case of images representing the elements on the display screen, the values associated with parameters control the display characteristics (i.e., shape, size, color, etc., of the image displayed) of the image on the web page.

In step 220, browser 111A receives selection points from a user on the displayed interactive page. A selection may be in the form of a click (e.g., with respect to a clickable element), or a touch (e.g., with respect to a touch-enabled element), such that the selection point refers to a specific point on the displayed interactive page where the click/touch was received. The selection points may be used to understand a variety of user interactions, and can be spread over a long duration. For example, the selection points may be used to understand users' preference for a particular element on an interactive page, or users' propensity to either select or mis-select around a particular element on an interactive page. Mis-selection implies that the selection point is not covered by the boundary of any element on the display, but such selection point can be reasonably associated with the particular element in view of the proximity of the selection point to the area covered by the particular element on the display.

In step 230, server 130 determines, based on received selection points, a new value for a parameter controlling the display characteristic of a first interactive element. In the example of a many selection points representing a user preference for a particular element on an interactive page, the new value of the parameter controlling the display characteristic of that element could have the effect of enlarging the element on the page. On the other hand, in case of many mis-selections associated with a particular element, the size of that element can be enhanced, or the spacing of the element from other surrounding elements can be increased to make the selection easier. When the spacing is increased, there is more un-selectable area between the particular element and adjacent element. However, new values can be assigned to other parameters controlling the corresponding display characteristics based on other types of selection patterns (typically for better user interface), as suitable in the corresponding environments, as will be apparent to a skilled practitioner by reading the present disclosure.

In step 260, the interactive page is displayed with the new value of the parameter for the first interactive element. Therefore, in the example of the user's preference for a particular element, the interactive page is displayed with the element enlarged in display for that particular user. Alternatively, or in addition, the free space around some of the elements may be increased, in the specific illustrative examples noted above. The flowchart ends in step 299.

Thus, in accordance with FIG. 2, a user may interact with an interactive page on potentially one or more visits, where after new values may be assigned to parameters of an interactive element such that the interactive page may be displayed with new parameter values of the element when the user views the interactive page on a subsequent visit.

While the above features are applicable in a variety of environments, the description is continued with reference to an end user system that is implemented as a mobile system (e.g., a mobile phone, a tablet etc.), such that the user system has a corresponding mobile display screen, and where the disclosure operates to show an updated interactive page on the mobile display screen.

4. User Interfaces

Figure 3A:
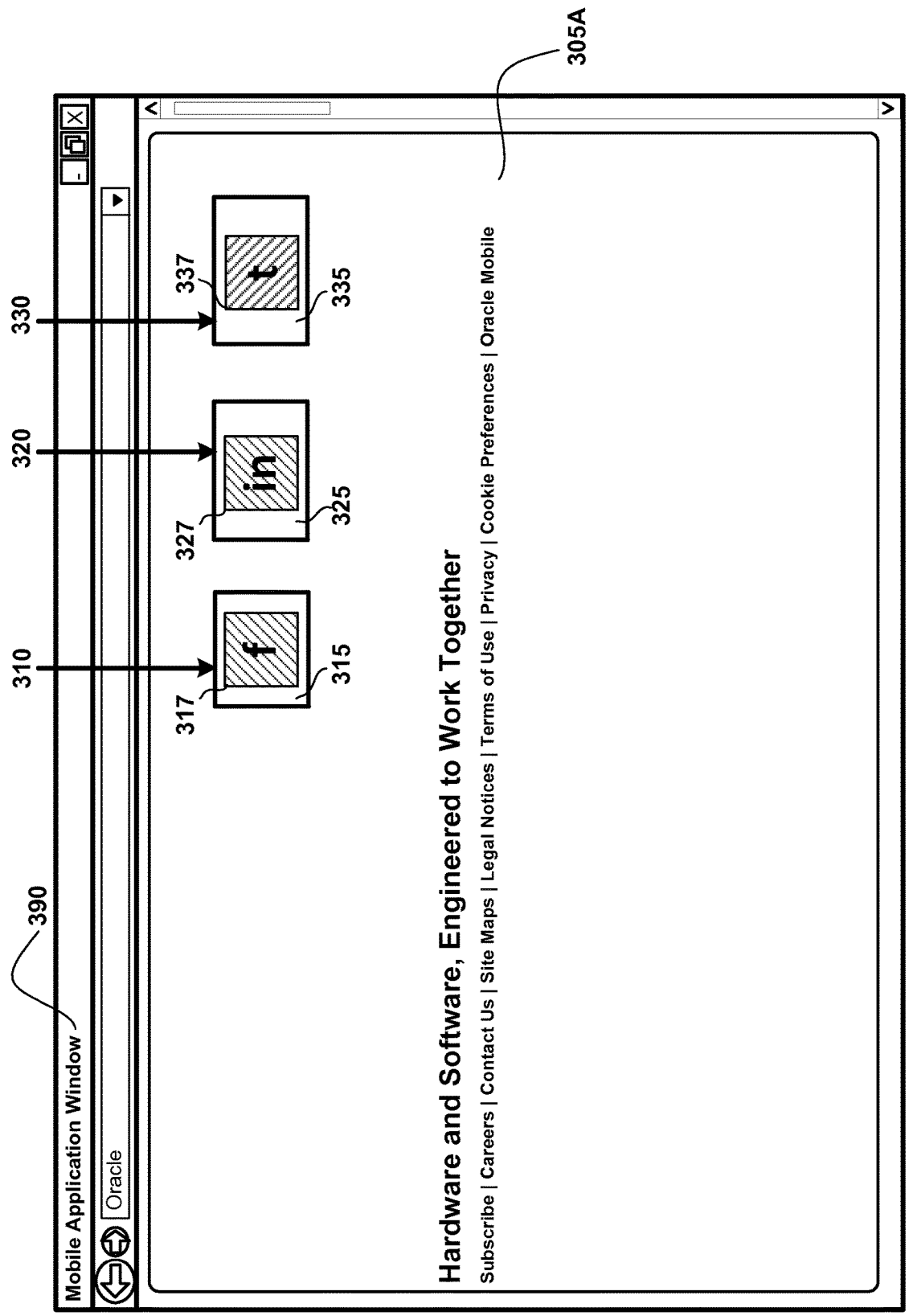
FIGS. 3A-3B depict user interfaces illustrating the manner in which the size of an interactive element may be altered based on user selections, in one embodiment.
Figure 3B:
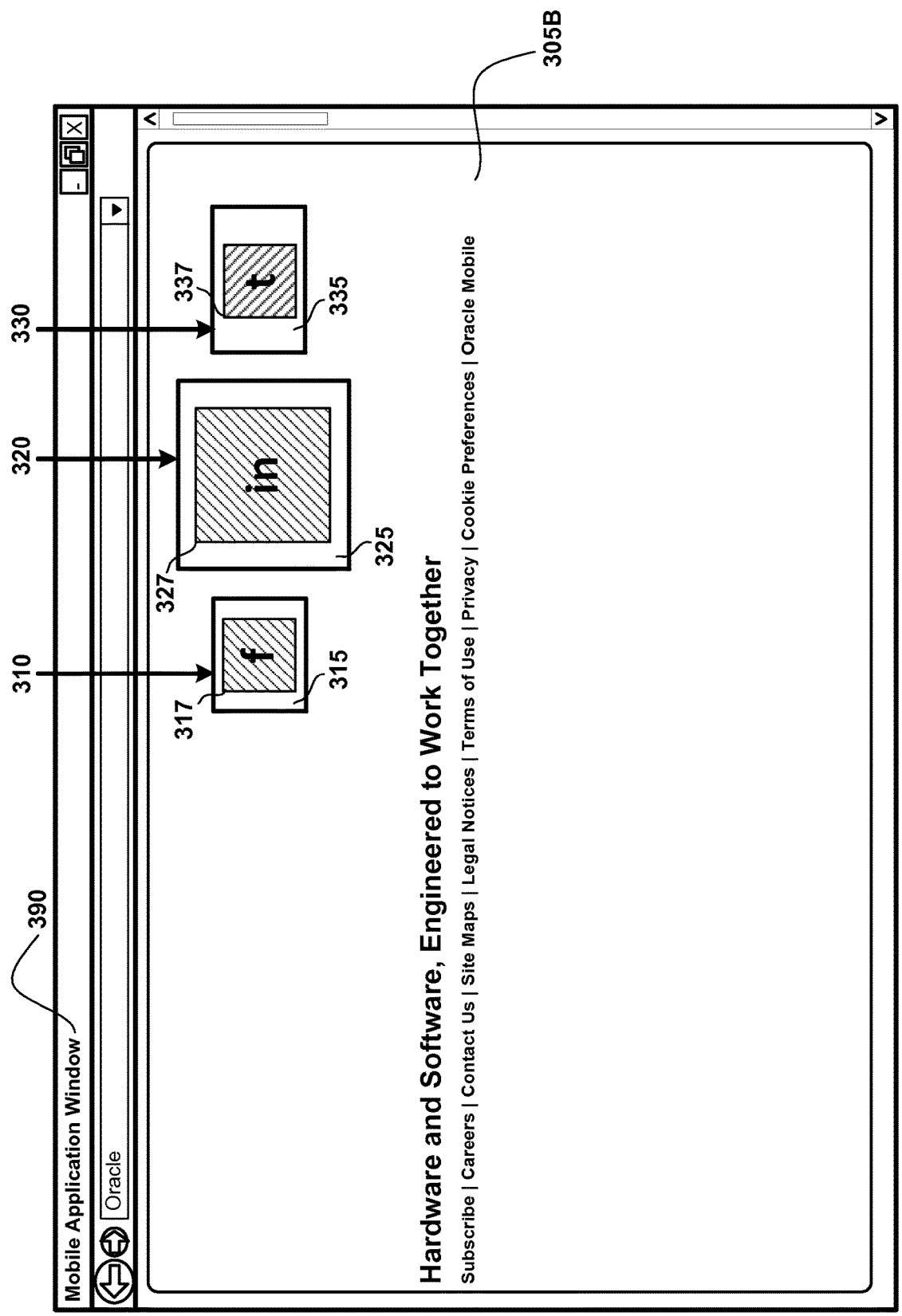

FIGS. 3A-3B depict corresponding user interfaces that are provided by a browser software on a display screen of end user systems, when a user accesses a same web page (e.g., with the same URL) in one embodiment. In the examples of FIGS. 3A-3B, end user system 110A is a mobile device (e.g., a mobile phone, a tablet, etc.) and the user interface is provided via small display screen, also having touch features. Each of the user interfaces is described below in detail.

FIG. 3A depicts the user interface provided on a mobile application window 390 (a window displayed supporting a mobile application) on a user's first visit to the web page. Display area 305A shows the web page, including interactive elements 310-330. The user may select any of the interactive elements 310-330 to access a corresponding website. For example, selecting the interactive element 310 provides the user access to a Facebook® page.

Accordingly, selection of an interactive element is considered a user input on the web page; where after the mobile application on server 130 processes the user input to provide a corresponding utility for the users, which in the example elements of FIG. 3A refers to providing access to a different web page.

The display characteristics of each of the interactive elements 310-330 determine the elements' appearance on the display screen 305A. For example, interactive elements 310-330 are each defined by respective parameters such as height and width such that the values that correspond to these parameters define how the interactive elements are displayed on the display screen 305A. In addition, display attributes (such as position of the respective elements) may control the distance between the elements.

In an embodiment, in order to determine the mis-selections associated with elements on the web page, end user system 110A determines the boundaries of the elements as well as virtual zones around the elements.

As a first step in determining the boundary of an element, the specific location of the interactive element on the display screen is obtained. The location of the interactive element is determined via the element's display attributes, which are obtained by parsing the page specification of the interactive page.

Thereafter, the boundary of the element is determined by using the element's location in conjunction with the element's parameter values such as the width and height. The boundaries of interactive elements 310, 320, and 330 are shown by reference numerals 317, 327, and 337 respectively. For each of the elements, the area within the boundary may be referred to as the element area. Once the element area is determined, for each element, a virtual mis-selection zone is defined.

In an embodiment, the virtual zone may be calculated as a function of the current parameter values for a particular element. For example, if an element has a height and width of 20 pixels each, the virtual zone may be determined as the area surrounding the element's boundaries and set-off from the boundaries on all sides by 2 pixels each (i.e., 10% of the parameter values). The virtual zones of interactive elements 310, 320, and 330 are shown by reference numerals 315, 325, and 335 respectively. For each of the elements, the area within the virtual zone (and outside the element area) may be referred to as the padding area. The element area is shown shaded for each element (e.g., 317, 327, and 337), while the padding area is shown as white area (unshaded) by the corresponding boundaries (315, 325 and 335).

Therefore, for each interactive element on an interactive page, an element area and a padding area are defined. Thereafter, end user system monitors the user's selection points (i.e., touch inputs) for elements on the page, in accordance with step 220 of FIG. 2, and categorizes each selection as a good click or a bad click. Specifically, any selection point within the element area of an interactive element may be considered a good click, whereas any selection point in the element's padding area may be considered a bad click. Although the term 'click' is used to describe the embodiments, it would be apparent to one skilled in the art by reading the disclosure herein, that the term 'click' includes any type of user selection, including, click, touch etc.

In a particular user visit, for those elements for which the number of bad clicks exceeds a pre-determined threshold, end-user system 110A marks such elements as bad elements. End-user system 110A then communicates information on such bad elements (e.g., element name, distance of the click from the element area, etc.) along with the identity of the user associated with the bad elements (i.e., the user who provided the mis-selections in the padding area) to server 130. Server 130 stores the user identity and information on the bad elements as part of a user interactivity profile database (UIP database).

When the user who interacted with the web page of FIG. 3A visits the same web page subsequently (i.e., at a different time duration), server 130 reviews the UIP database for any bad elements associated with the user. If there are bad elements associated with the user for the particular web page, server 130 calculates new parameter values for such bad elements and provides an updated page specification (with the new parameter values for bad elements) to end user system 110A. End user system 110A displays the web page to the user with new parameter values for bad elements, in accordance with step 260 of FIG. 2.

In accordance with step 220 of FIG. 2, after the interactive page of FIG. 3A is displayed to the user, it is assumed that the end user system 110A receives a number of touch inputs (i.e., selection points) from the user on the interactive element 320. It is further assumed that, due to a number of mis-selections exceeding a pre-determined threshold, element 320 is marked as a bad element for the user. Subsequently, it is assumed that the user requests to view the same web page at a different instance in time.

According to step 230 of FIG. 2, server 130 receives the web page request, calculates new parameter values (i.e., new height and width) for element 320, configures the page specification of the interactive page with the new parameter values for element 320, and sends the page specification to the end user system 110A. After end user system 110A receives and processes the page specification, the updated web page is rendered on the user's display screen with new parameter values for element 320.

FIG. 3B shows the updated web page (of FIG. 3A) rendered with updated parameter values for element 320, in accordance with step 260 of FIG. 2. Specifically, the parameter values that correspond to height and width of element 320 are updated with new values. As shown in FIG. 3B, element 320 is shown proportionally larger in size than the size shown in FIG. 3A. Therefore, it may be assumed that the parameters such as the height and width of the interactive element have been updated to respective new (i.e., higher) values.

Although the examples of FIGS. 3A and 3B are described with respect to a user's mis-selections leading to a larger element size being rendered in a subsequent visit, the examples may be applicable to other user interactions as well. For example, in accordance with step 220 of FIG. 2, after the interactive page of FIG. 3A is displayed to the user, it may assumed that the end user system 110A receives a higher frequency/count of touch inputs (i.e., selection points) in the element area of element 320, as compared to the touch inputs in the element areas of other interactive elements displayed to the user. In such a case, the higher frequency/count of touch inputs on an element may be interpreted as indicating the user's preference for that particular interactive element.

Thereafter, upon the user's subsequent visit to the web page, in accordance with step 260 of FIG. 2, the web page may be rendered with new (larger) parameter values for element 320, similar to the example shown in FIG. 3B.

Alternately, or in addition, the parameter values of the interactive elements that are selected with less frequency may be lowered from their previous values such that the interactive element with the higher touch input frequency appears larger in proportion in comparison to the other less-selected elements.

In an embodiment, when an element's size is enlarged due to the user's prior mis-selections of the element, the element's boundary is proportionately pushed outward, and the inter-element distance between the enlarged element and a nearby element is thereby reduced. In other embodiments, the inter-element distance between an element and a nearby element is low without regard to any potential enlargement of the element due to prior user mis-selections.

The description is continued with FIGS. 4A and 4B below, which provide an example scenario where the distance between two closely-placed elements on an interactive page is determined to be low (e.g., due to the increase in element's size), based on a pre-determined formula, and subsequently the distance is increased such that the new distance is no longer considered a low distance based on the formula.

Figure 4A:
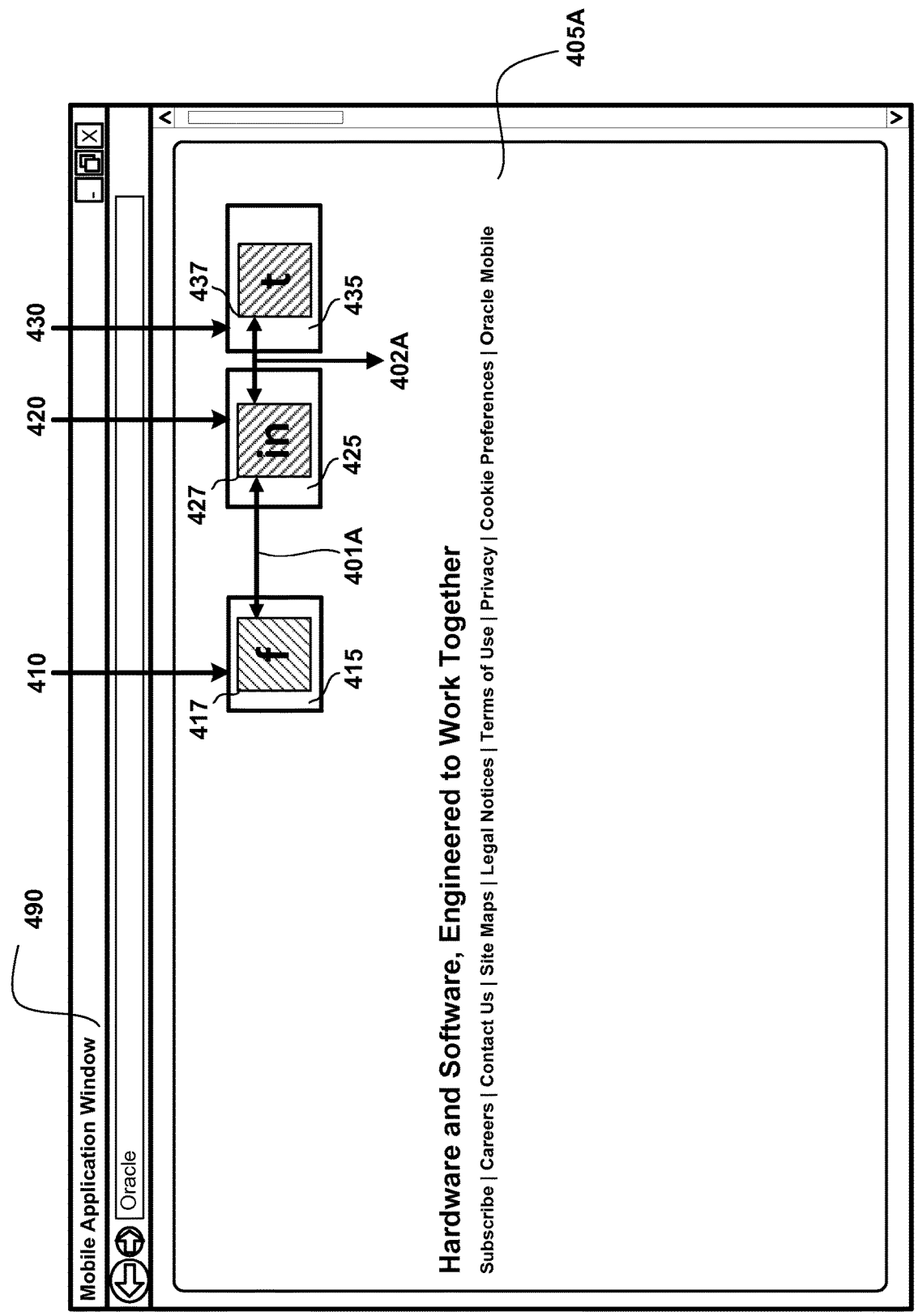
FIGS. 4A-4B depict the manner in which distance between interactive elements may be altered based on user selections, in one embodiment.
Figure 4B:
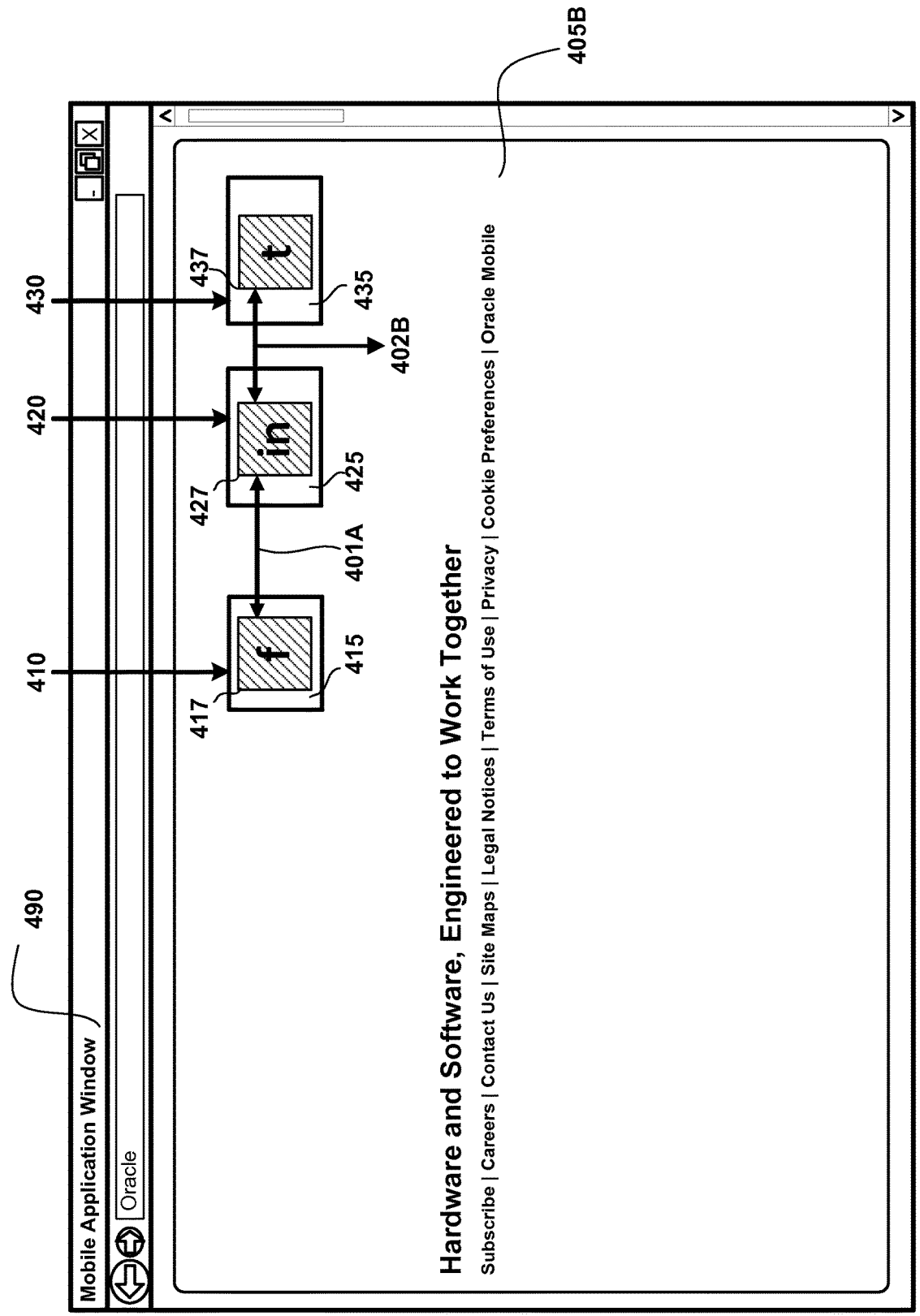

FIGS. 4A and 4B depict corresponding user interfaces that are provided on a display screen of end user systems, when a user accesses a same web page in one embodiment. In the examples of FIGS. 4A and 4B, end user system 110A is a mobile device (e.g., iPHONE version 6 available from Apple Corporation) and the user interface is provided via small display screen, also having touch features. Each of the user interfaces is described below in detail.

FIG. 4A depicts the user interface provided on a mobile application window 490 on a user's first visit to the web page. Display area 405A shows the web page, including interactive elements 410-430. As described with reference to the interactive elements in FIG. 3A, the user may select any of the interactive elements 410-430 to access a corresponding website associated with the selected element. For example, selecting the interactive element 410 provides the user access to a Facebook® page.

The element areas of interactive elements 410, 420, and 430 are shown by reference numerals 417, 427, and 437 respectively. The padding areas of interactive elements 410, 420, and 430 are shown by reference numerals 415, 425, and 435 respectively.

Additionally, inter-element distances between each pair of adjacent elements are shown. The inter-element distance between interactive elements 410 and 420 is shown by distance 401A. Similarly, the inter-element distance between interactive elements 420 and 430 is shown by distance 402A.

In accordance with step 220 of FIG. 2, after the interactive page of FIG. 4A is displayed to the user, it is assumed that the end user system 110A or server system 130 determines the inter-element distance between elements 420 and 430 to be low based on a pre-determined formula. Thereafter, both elements 420 and 430 are marked as bad elements for the user. Subsequently, it is assumed that the user requests to view the same web page at a different instance in time.

According to step 230 of FIG. 2, server 130 receives the web page request, calculates new inter-element distance between elements 420 and 430, configures the page specification of the interactive page with the new inter-element distance, and sends the page specification to the end user system 110A. After end user system 110A receives and processes the page specification, the updated web page is rendered on the user's display screen with the new inter-element distance between elements 420 and 430.

FIG. 4B shows the updated web page (of FIG. 4A) rendered with the updated inter-element distance between elements 420 and 430, in accordance with step 260 of FIG. 2. As shown in FIG. 4B, the new inter-element distance 402B between interactive elements 420 and 430 is more than the previous distance 402A (as shown in FIG. 4A).

It should be thus appreciated that the increase in size of an element may cause reduction in the inter-element-distance (IED), but in accordance with the description of above, the IED is increased such that the final IED is more than that before the increase of the size of the element.

Furthermore, as noted above, in alternative embodiments the IED may be reduced (without increase in element size) when there are material number of mis-selections of one of the elements. For example, if the padded area of one element overlaps with the padded area of another element, and it is observed that the user clicks/selects in the overlap area a substantial number of times, the IED may be increased between the two elements. The selection of padded area in such a context is treated as a mis-selection.

It should be appreciated that the interfaces described above can be implemented in various ways, by any required coordination between end user systems and server system. The description is continued with respect to the details of embodiments of end user system 110A and server system 130, with coordination according to an example approach.

5. End User System

Figure 5:
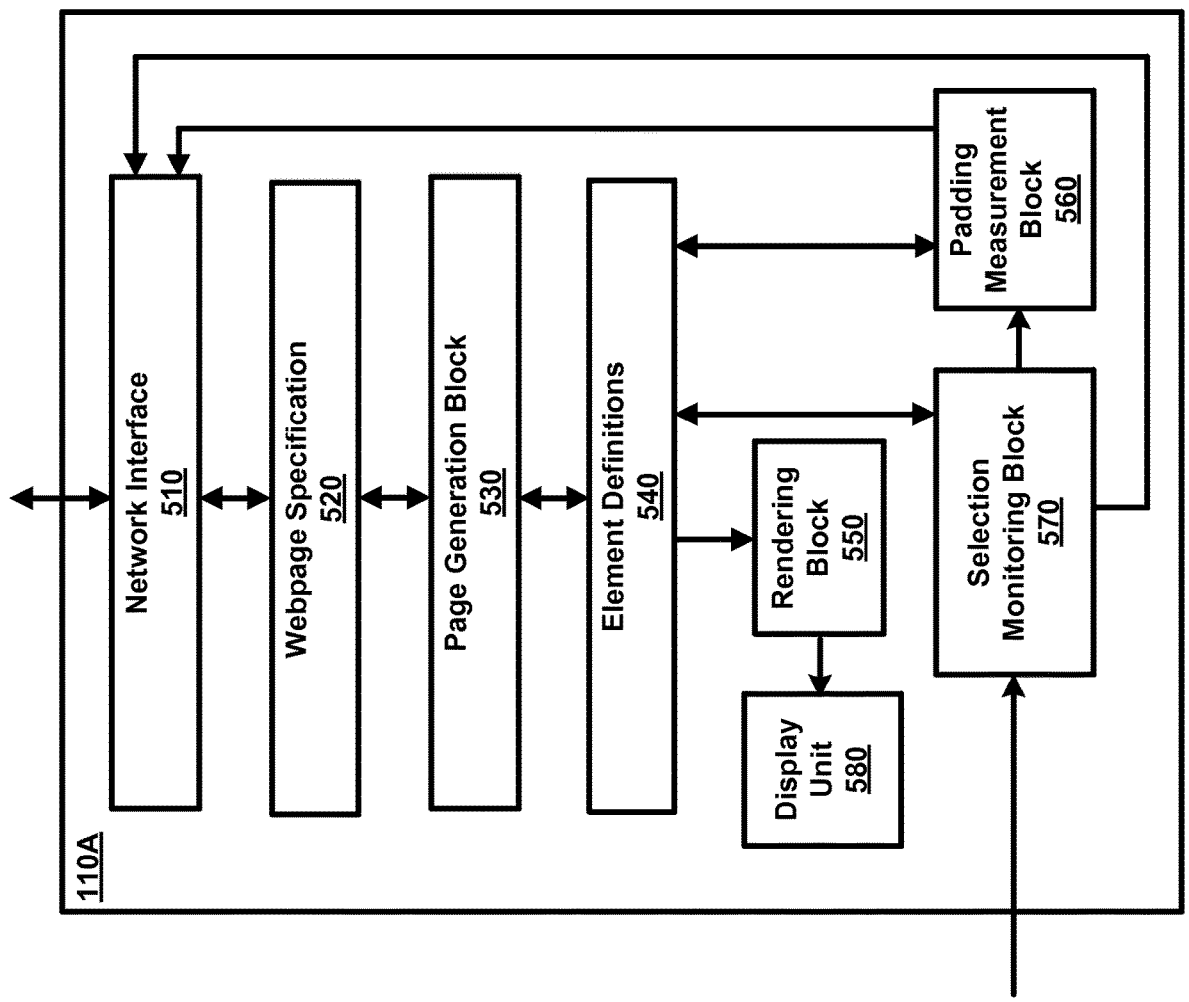
FIG. 5 is a block diagram illustrating the detailed architecture of an end user system, in an embodiment.

FIG. 5 is a block diagram illustrating the detailed architecture of end user system 110A in an embodiment. The block diagram is shown containing network interface 510, web page definition 520, page generation block 530, element definitions 540, rendering block 550, selection monitoring block 570, padding measurement block 560, and display unit 580. Each of the blocks is described in detail below.

Network interface 510 represents a communication interface (e.g., an Ethernet card) to enable various blocks of end user system 110A to communicate with server system 130 via Internet 120. In general, network interface 510 sends packets directed to other external systems shown in FIG. 1 (i.e., server system 130) upon receipt of the corresponding packets from the respective block with identity of the target system. Similarly, packets directed to end user system 110A are examined for forwarding to appropriate internal block (e.g., 520), typically based on the TCP/UDP port number. In the context of a user receiving an interactive page (i.e., a web page) from server system 130, network interface 510 receives the packets corresponding to the web page and stores the payload in the packets as web page specification 520.

Web page specification 520 represents the specification (e.g., HTML) of the web page(s) requested by the user and presently being rendered on the display unit 580. Specification defines various (interactive and non-interactive) elements and associated display characteristics. The characteristics may specify the interactive features, display attributes, content, shape, size, location, color, background, etc., as suited for the corresponding elements. The content of the corresponding web page thus specifies various elements and the characteristics of the elements. In an embodiment, web page specification 520 contains (a) values of parameters controlling the associated display characteristics of the elements, and (b) the action/behavior of the displayed elements (e.g., upon user selection of the element, the corresponding action required), in a known way.

Element definitions 540 contain the elements that define a web page's current view as rendered on display unit 580. For each such web page, element definitions 540 contain a corresponding display map, indicating what elements of the web page specification are displayed on which area (element area) on the rendered web page. Element definitions 540 may also include data representing any user inputs provided by the user, and the corresponding display changes caused as a result.

Rendering block 550 processes the display characteristics of elements from element definitions 540 and renders the web page on the display unit 580. Such rendering may entail generating a bit map with appropriate color values for each bit/pixel position, and generating display signals (e.g., in RGB format) representing the bit map to display unit 580.

Display unit 580 displays the web page rendered by the rendering block 550. Display unit 580 may be any display device connected to the end user system 110A through wired or wireless medium.

Page generation block 530 generates element definitions 540 by processing web specification 520. As noted above, the element definitions include the element area corresponding to each element. In one embodiment, element definitions 540 are also generated to specify the padding area of each interactive element of a web page, which is subsequently used by selection monitoring block 570 while monitoring the web page for user's selection points. In an alternative embodiment, the padding area related specification and related processing are left to server system 130, as described below.

Selection monitoring block 570 monitors the web page for a user's selection points (i.e., the X, Y coordinates of the touch inputs or clicks) on the page. Upon receiving a selection point, selection monitoring block 570 determines whether the selection is in the element area of the corresponding element. If the selection is in the element area, the corresponding action specified in the web page specification (and stored in element definitions 540) is performed, in a known way. For example, if the actions correspond to 'submit', the inputs already presented with other elements may be transmitted to server system 130 via network interface 510.

However, if the selection does not fall within the area defined by any of the element areas currently displayed, then selection monitoring block 570 passes the selection (e.g., the location of the touch input defined by x,y coordinates) to padding measurement block 560. Selection monitoring block 570 may count and communicate to server system 130, the number of good clicks (i.e., selections) associated with respective elements as well.

Padding measurement block 560 determines whether the selection point is in the padding area associated with any of the displayed elements. If the selection is in the padding area of a specific displayed element, padding measurement block 560 counts the selection as a bad click for that area. If the selection is outside the padding areas of all displayed elements also, padding measurement block 560 ignores the click. For those elements for which the number of bad clicks exceeds a pre-determined threshold, padding measurement block 560 marks such elements as bad elements. Padding measurement block 560 then communicates information on such bad elements (e.g., element name, distance of the click from the element area, number of bad clicks, etc.) along with the identity of the user associated with the bad elements (i.e., the user who provided the bad clicks in the padding area) to server 130 via network interface 510.

The description is continued with respect to the details of server system 130 in an embodiment.

6. Server System

FIG. 6 is a block diagram illustrating the detailed architecture of server system 130 in an embodiment. The block diagram is shown containing network interface 610, web server 620, application server 630, page modification block 640, page definitions 650, UIP database 660, RES database 670, and RIED database 680. Each of the blocks may be implemented as a desired combination of hardware, software and firmware, and is described in detail below.

Network interface 610 represents a communication interface (e.g., an Ethernet card) to enable various blocks of server system 130 to communicate with external systems/devices through Internet 120. In general, network interface 610 sends packets directed to other external systems shown in FIG. 1 upon receipt of the corresponding packets, with identity of the target system, from the respective block. Similarly, packets directed to server system 130 are examined for forwarding to appropriate internal block.

Application server 630 executes (or hosts) applications that process user requests received from end user systems 110A-110Z. Application server 630 provides a common development/run-time environment and other software infra-structure elements for executing such multiple applications. In operation, application server 630 generates content to be used in forming the web pages served by web server 620. An example application server is Oracle Weblogic Server™.

Page definitions 650 represent the specifications (e.g., HTML) of all web pages stored in server system 130 and maintained by applications executing on application server 630. The specification of the web pages defines various display elements and associated characteristics. The characteristics may specify the interactive features, content, shape, size, location, color, background, etc., as suited for the corresponding elements.

Page modification block 640 receives and processes monitoring data from end user system 110A. Specifically, page modification block 640 receives monitoring data on users from end user system 110A, and stores it in the UIP database 660. For each element for which monitoring data is received, page modification block 640 calculates new parameter values and stores the corresponding values in RES database 670 or RIED database 680. Further, in response to a user request to serve an updated web page, page modification block 640 forms a modified specification of the requested web page based on updated parameter values provided in RES database 670 and RIED database 680.

UIP database 660 represents a database that stores the user interactivity profiles of one or more users interacting with the web pages provided by web server 620 on end user systems 110A-110Z. As noted earlier, selection monitoring block 570 and padding measurement block 560 send information on the identity of the user interacting with the web page along with the data on the monitored elements to be stored on server 130 as part of a user interactivity profile (UIP) database.

RES (Recommended Element Size) database 670 stores new element sizes of interactive elements. In an embodiment, when a user, whose interactivity profile with respect to a web page has been stored in UIP database 660, requests a new instance of the same web page, new element sizes for the elements are calculated and stored in RES database 670. In another embodiment, new element sizes are calculated immediately after the corresponding element data is stored in the UIP database 660.

RIED (Recommended Inter-Element Distance) database 680 stores new inter-element distances of element pairs. In an embodiment, when a user, whose interactivity profile with respect to a web page has been stored in UIP database 660, requests a new instance of the same web page, new inter-element distances for the element pairs stored in the UIP database 660 are calculated and stored in RIED database 680. The new inter-element distances are provided to the page modification block 670 along with any new element sizes calculated in RES database 670. In another embodiment, new inter-element distances are calculated immediately after the corresponding element data is stored in the UIP database 660. The page modification block 640 then modifies the specification of the web page it receives from page definitions 650 to provide an updated web page definition to web server 620.

Web server 620 serves web pages to end user systems in response to corresponding (web page) requests. Each web page request may be processed according to the page definition of the requested page stored in page definitions 650, as modified by the page modification block 640. In the process, application server 630 may be used for generating the content of the web page. The web page request may be viewed as representing the user's request, and the web page sent may be viewed as a response to the user request. Thus, web server 620 packages the content received from application server 630 in the form of a web page according to the page definition stored in page definitions 650 and modified by page modification block 640, and sends the formed web page as a response to the user request for rendering on a web browser (e.g., browser 111A) at the end user system.

In operation, upon receiving request for a web page from an end user system (110A-110Z) via browser software executing on the respective end user system, the web server 620 uses content generated by application server 630 and forms the web page based on a page definition stored in page definition 650 and potentially modified by page modification block 640. The element size and inter-element distance of one or more of the elements in the web page may potentially be modified by data contained in RES database 670 and RIED database 680 respectively. The web server serves the formed web page to the requesting end user system for rendering as page instance on a corresponding web browser at the end user system.

Thus, based on selections and mis-selections, the display characteristics of electronic pages are conveniently altered, as described above. The description is continued with respect to the manner in which mis-selections are determined in an embodiment.

7. Mis-Selections

In an embodiment, in order to determine the mis-selections associated with elements on the web page, end user system 110A first defines virtual zones as a narrow area surrounding the element area, and then later monitors the user selections with respect to the elements and the associated virtual zones.

First, end user system 110A parses the specification of the web page to determine the location of all interactive elements on the display screen. The location of an element is determined by a pair of x, y coordinates on the display screen that represents the 'top-left' point of the element on the display screen.

X, y coordinates are respectively the horizontal and vertical addresses of a pixel on a computer display screen. The x coordinate is a given number of pixels along the horizontal axis of a display screen starting from the pixel on the extreme left of the screen. The y coordinate is a given number of pixels along the vertical axis of a display screen starting from the pixel at the top of the screen. Together, the x and y coordinates locate any specific pixel location on the screen.

End user system 110A then determines a bounding rectangle of each interactive element, starting with the top-left point of the element on the screen (determined via the x, y coordinates), and completing the (bounding) rectangle by using the width, and height of that element as defined by the element's parameter values. For example, the bounding rectangle for interactive elements 310, 320, and 330 are the element's boundaries, shown by reference numerals 317, 327, and 337 respectively.

Thereafter, for each element, end user system 110A determines a standard element border (SEB), which is calculated as a function of the element's current parameter values. For example, if element 320 has a height and width of 20 pixels each, the SEB for the element may be calculated as follows: (a) Left side of the SEB=10% of element width (2 pixels); (b) Right side of the SEB=the left side of the SEB (2 pixels); (c) Top side of the SEB=10% of element height (2 pixels); and (d) Bottom side of the SEB=Top side of the SEB (2 pixels). The SEBs are not displayed on the display screen.

Thereafter, a Virtual Element Zone Border Padding (VEZBP) is calculated for each interactive element. In an embodiment, the VEZBP for a particular interactive element is defined as the minimum of Quarter of Inter-Element Distance (QIED) and the SEB for the respective element (i.e., VEZBP=min(QIED, SEB)). The VEZBP may be considered as analogous to the padding area described earlier.

The Inter-Element Distance in the QIED is the distance between the interactive element of interest and another interactive element closest to it in location. For example, the inter-element distance between interactive elements 410 and 420 is shown by distance 401A. Similarly, the inter-element distance between interactive elements 420 and 430 is shown by distance 402A.

Once the bounding rectangle, the SEB and the VEZBP are defined for each interactive element, end user system 110A monitors the web page for a user's selection points (i.e., touch inputs) on the page, in accordance with step 220 of FIG. 2.

In an embodiment, end user system 110A categorizes user's selection points as good clicks and bad clicks. Specifically, any selection point on an interactive element (i.e., within the bounding rectangle of the element) and/or a pre-determined area outside the interactive element may be considered a good click, whereas any selection point in the element's VEZBP may be considered a bad click. Although the term 'click' is used to describe the embodiments, it would be apparent to one skilled in the art by reading the disclosure herein, that the term 'click' includes any type of user selection, including, click, touch etc.

In an embodiment, if the percentage of good clicks (PGC) for a particular element is over 75%, the element is marked as a good element, whereas elements with PGC of less than or equal to 75% are marked as bad elements. Alternately, or in addition, a pair of interactive elements may be marked as bad elements if the QIED between the elements is less than half of the distance between the bounding rectangle and the SEB for one of the elements in the pair.

End user system 110A therefore categorizes interactive elements as good elements and bad elements (based on the PGC and/or the low-QIED calculations) for a particular user visit. It then sends this information (either good elements, or bad elements, or both) along with the identity of the user to server 130, to be stored on server 130 as part of a user interactivity profile database (UIP database).

The UIP database may be configured to hold the user identity and identity of the good/bad elements in one or more combinations, as suited in the corresponding environments. For example, the UIP database may hold one record per user per page (by aggregating all user visits to a page at different time instances), or one record per user per page per visit (i.e., each visit occurring during a pre-defined time period), or one record per user per session per page (assuming there are multiple sessions in a single visit), or multiple records for each user per page depending on the resolution of the display screen from which the page was accessed, or any other combination as suited in the corresponding environments.

When the same user who interacted with a web page (e.g., of FIG. 4A) visits the same web page subsequently, server 130 reviews the UIP database for the bad elements associated with the user, calculates new parameter values for the bad elements, and provides an updated web page specification (with the new parameter values for bad elements) to end user system 110A. End user system 110A displays the web page on the display screen to the user, with the new parameter values for the bad elements, in accordance with step 260 of FIG. 2.

For elements marked as bad elements due to a low PGC, server 130 may calculate the element's new parameter values (for display size) as a function of the element's previous parameter values (for display size). For example, the element's new size may be calculated as the element's previous size+average distance of selection points in the VEZBP from the element's bounding rectangle.

For elements marked as bad elements due to low-QIED, server 130 may calculate the new inter-element distance between the pair of elements as a function of the SEB. For example, the recommended inter-element distance may be calculated as (0.5*the SEB of one of the elements).

The description is continued with some example data structures supporting the description above.

8. Data Structures

As described above with reference to FIG. 5, selection monitoring block 570 monitors a rendered web page for a user's selection points, and the padding measurement block 560 sends the identity of the user interacting with the web page along with the data on bad elements to be stored on server 130 as part of a user interactivity profile (UIP) database. FIG. 7A illustrates the manner (logically) in which the UIP database is maintained on server 130. Specifically, FIG. 7A shows exemplary data structures of users' interactivity profile, wherein the profiles are stored in relation to the identity of users of the web page.

FIG. 7A illustrates the user interactivity profile data stored on server system 130. Only some of the fields of the UIP database, as relevant to an understanding of the disclosure, are depicted in the Figure for conciseness. The remaining fields will be apparent to persons skilled in the art based on the aspects of the disclosure provided herein.

UIP database 660 is shown containing several fields, with the associated values shown in rows 750A-750E. Specifically, UIP database 660 contains row id 710, web page name 711, user-id 712, screen size 713, timestamp 714, and data 715.

Row id 710 represents the position of the corresponding row of data in the UIP database 660.

Web page name 711 represents the URL of the web page for which monitored data is stored in the UIP database. Although the URLs shown in FIG. 7A are relative URLs (i.e., the name of the html document without the preceding www identifiers), shown for the sake of illustration, absolute URLs may also be stored in this field without deviating from the scope of the present disclosure, as would be apparent to those skilled in the art.

User-id 712 stores the user identification of the user for whom the corresponding row of monitored data is stored in UIP database 660. In an embodiment, as shown in FIG. 7A, multiple rows are associated with the same user id, (a) either in conjunction with different web pages, or (b) in conjunction with the same web page, but with different display sizes of the screens on which the data is monitored, or (c) in conjunction with the same web page, but with different timestamps.

Screen size 713 stores the screen size (i.e., resolution) of the display screen using which the user interacted with the web page shown in column 711 during the time period shown in column 714.

Timestamp 714 stores the time period during which the user interacted with the web page shown in column 711. The timestamp could represent a single instance of time at which time the entry in UIP database 660 is created, or an aggregate time period calculated between a starting and ending time durations during which the user interactions were monitored, or any other such combination, as would be apparent to persons skilled in the art by reading the disclosure herein.

Data 715 represents the stored monitored data. In an embodiment, the monitored data stores only bad elements. In another embodiment, monitored data stores data regarding all elements on the web page.

Rows 750A-750E show the various monitored data stored with respect to users. Rows 750A, and 750C-750E all show monitored data for a user with user id 23274. Row 750B shows monitored data for a user with user id 28747. Per Row 750A, monitored data about a user 23274 viewing a first web page results.html during time period TS1 on an extra small screen with width less than 768 pixels is stored in column 715.

Rows 750C-750E show monitored data for the same user (23274) for the same web page (contactus.html) during various time periods (TS2, TS3, and TS4) with different display screen sizes (medium and large). As shown, for the same web page, different data may be stored if the screen sizes are different (rows 750C and 750D), or if the time periods of monitoring are different (rows 750D and 750E).

FIG. 7B illustrates example monitored data stored for a user, as shown stored in field 715 of FIG. 7A. As shown, line number 785 stores the standard element border ("seb") and virtual element zone border padding ("vezbp") parameters for an element with id se4. Line 785 also shows the number of good clicks ("gc") and bad clicks ("bc"), and the average distance of a click ("adc") in the virtual element zone border padding for that element. Therefore, line 785 stores the element size quality of the monitored element.

Line number 792 stores the standard element border ("seb-set") for a pair of elements with ids se2 and se3. Line 792 also shows the inter-element distance ("inter-elem-dist") between the two elements in the pair. Therefore, line 792 stores the inter-element distance quality of the monitored element pairs. As shown, lines 785 and 792 may be viewed as showing only the data for bad elements.

Figure 7C:
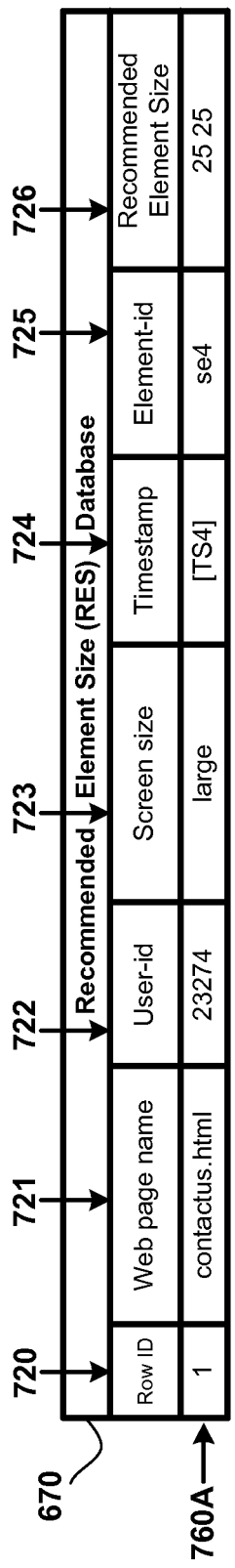
FIG. 7C illustrates the manner in which recommended element sizes for interactive elements are maintained on server system, in an embodiment.
Figure 7D:
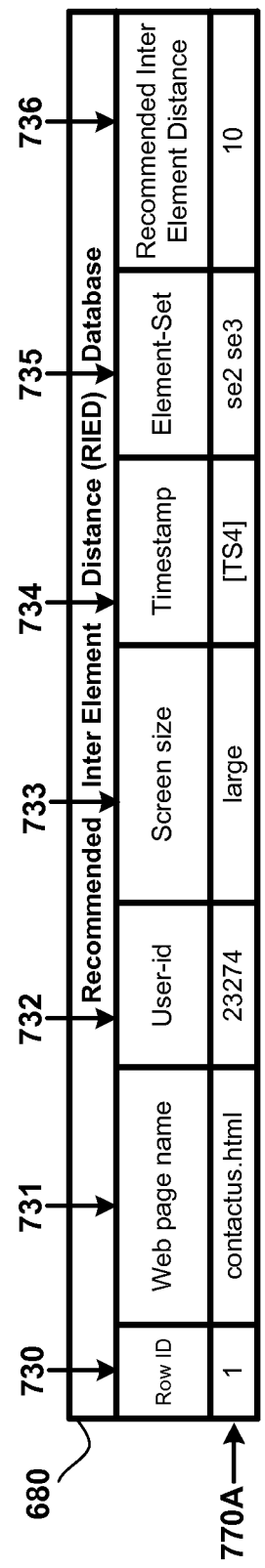
FIG. 7D illustrates the manner in which recommended inter-element distances for interactive elements are maintained on server system, in an embodiment.

As described above with reference to FIG. 6, for each web page requested by the user, web server 620 utilizes the modified specification provided in the page modification block 640. New element sizes and element distances of some of the elements on the web page identified in the UIP database for the requesting user are calculated and stored in RES database 670 and RIED database 680, and passed as inputs to page modification block 640. FIGS. 7C and 7D respectively illustrate the manner (logically) in which RES database 670 and RIED database 680 are maintained on server 130. Specifically, FIGS. 7C and 7D show exemplary data structures of new element sizes and new inter-element distances respectively, wherein the element size and the element distance are stored in relation to a particular user of the web page.

FIGS. 7C and 7D illustrate the element size data and inter-element distance data stored on server system 130 respectively. Only some of the fields of the RES database and RIED database, as relevant to an understanding of the disclosure, are depicted in the Figures for conciseness. The remaining fields will be apparent to persons skilled in the art based on the applicable aspects of the disclosure provided herein.

RES database 670 is shown containing several fields, with the associated values shown in row 760A. Specifically, RES database 670 contains row id 720, web page name 721, user-id 722, screen size 723, timestamp 724, element-id 725, and recommended element size 726.

Row id 720 represents the position of the corresponding row of data in the RES database 670. Web page name 721 represents the URL of the web page for which the new element size is calculated. User-id 722 stores the user identification of the user for whom the corresponding row of new element size is stored. Screen size 723 stores the screen size of the display screen using which the user is requesting the web page. Timestamp 724 stores the corresponding time period from UIP database 660.

Element id 725 stores the id of the bad element for which the new element size is calculated. Recommended element size 726 holds the newly calculated size of the bad element shown in column 725.

Row 760A shows the new element size calculated for element se4. As shown in FIG. 7B (row 785), element se4 had a higher percentage of bad clicks (100/120, i.e., 83%) than good clicks (20/120, i.e., 16%). Therefore a new element size is calculated and stored in column 726.

Referring to FIG. 7D, RIED database 680 is shown containing several fields, with the associated values shown in row 770A. Specifically, RIED database 680 contains row id 730, web page name 731, user-id 732, screen size 733, timestamp 734, element-set 735, and recommended inter-element distance 736.

Row id 730 represents the position of the corresponding row of data in the RIED database 680. Web page name 731 represents the URL of the web page for which the new inter-element distance is calculated. User-id 732 stores the user identification of the user for whom the corresponding row of new inter-element distance is stored. Screen size 733 stores the screen size of the display screen using which the user is requesting the web page. Timestamp 734 stores the corresponding time period from UIP database 660.

Element-set 735 stores the ids of the pair of bad elements for which the new inter-element distance is calculated. Recommended inter-element distance 736 holds the newly calculated inter-element distance between the pair of bad elements shown in column 735.

Row 770A shows the new inter-element distance calculated for element set se2-se3. As shown in FIG. 7B (row 792), elements se2-se3 had an inter-element distance of 5. This is assumed to be a low inter-element distance that needed to be increased. Therefore a new inter-element distance is calculated and stored in column 736.

It should be further appreciated that the features described above can be implemented in various embodiments as a desired combination of one or more of hardware, executable modules, and firmware. The description is continued with respect to an embodiment in which various features are operative when the instructions in the executable modules are executed.

9. Digital Processing System

Figure 8:
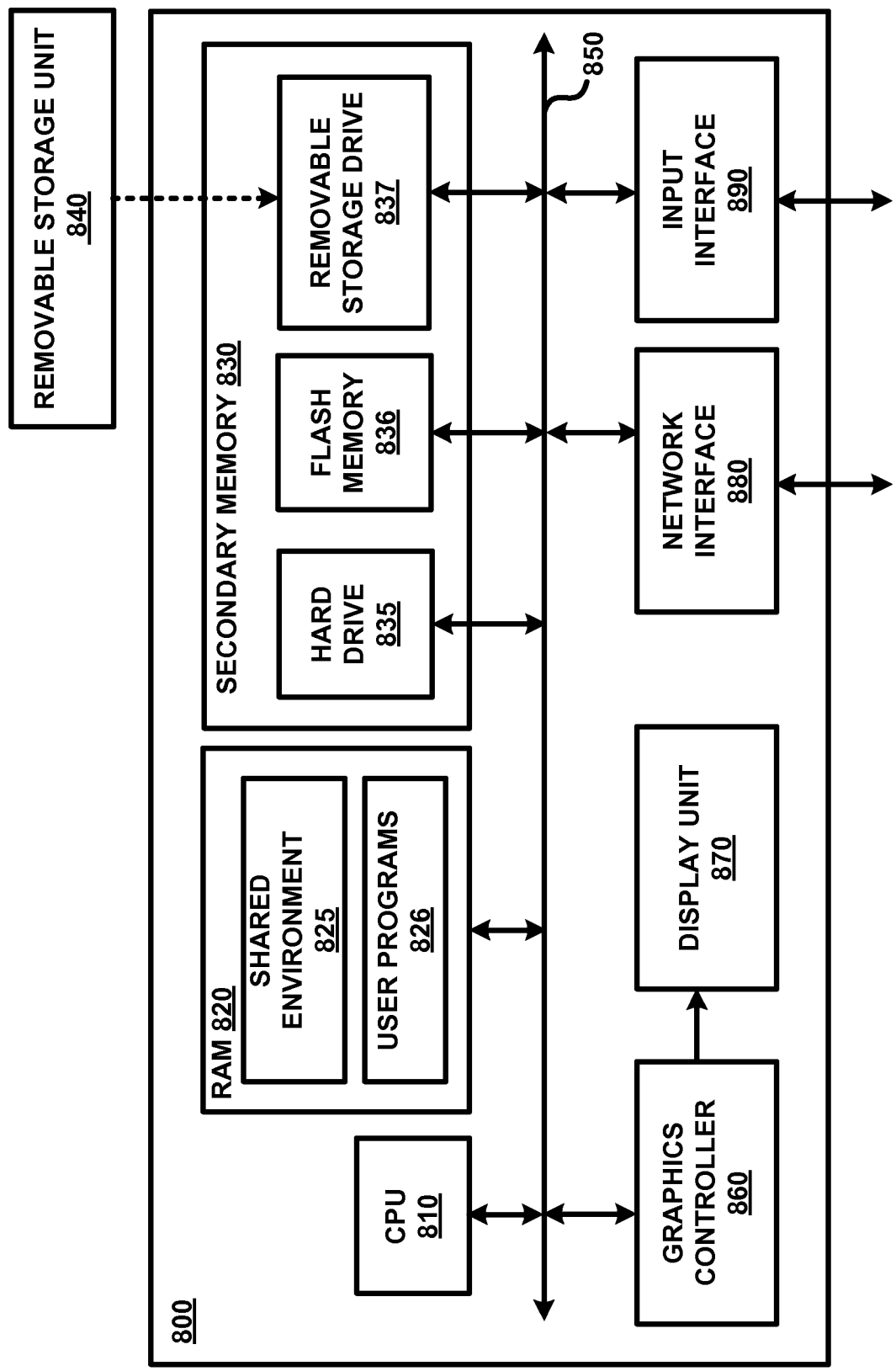
FIG. 8 is a block diagram illustrating the details of a digital processing system in which several aspects of the present disclosure are operative by execution of appropriate software instructions.

FIG. 8 is a block diagram illustrating the details of digital processing system 800 in which several aspects of the present disclosure are operative by execution of appropriate software instructions. Digital processing system 800 corresponds to end user systems 110A-110Z from which various features described above can be provided.

Digital processing system 800 may contain one or more processors (such as a central processing unit (CPU) 810), random access memory (RAM) 820, secondary memory 830, graphics controller 860, display unit 870, network interface 880, and input interface 890. All the components except display unit 870 may communicate with each other over communication path 850, which may contain several buses as is well known in the relevant arts. The components of FIG. 8 are described below in further detail.

CPU 810 may execute instructions stored in RAM 820 to provide several features of the present disclosure. CPU 810 may contain multiple processing units, with each processing unit potentially being designed for a specific task. Alternatively, CPU 810 may contain only a single general-purpose processing unit. RAM 820 may receive instructions from secondary memory 830 using communication path 850.

RAM 820 is shown currently containing software instructions constituting shared environment 825 and/or user programs 826 (such as browsers, etc.). Shared environment 825 contains utilities shared by user programs, and such shared utilities include operating system, device drivers, etc., which provide a (common) run time environment for execution of user programs 826.

Graphics controller 860 generates display signals (e.g., in RGB format) to display unit 870 based on data/instructions received from CPU 810. Display unit 870 contains a display screen to display the images defined by the display signals (such as the portions of the user interfaces of FIGS. 3A, 3B, 4A, and 4B). Input interface 890 may correspond to a keyboard and a pointing device (e.g., touch-pad, mouse) that may be used to provide various inputs (such as to specify the desired inputs, etc. in the user interfaces of FIGS. 3A, 3B, 4A, and 4B). Network interface 880 provides connectivity to a network (e.g., using Internet Protocol), and may be used to communicate with other connected systems (such as server system 130).

Secondary memory 830 may contain hard drive 835, flash memory 836, and removable storage drive 837. Secondary memory 830 represents a non-transitory medium, which may store the data (for example, web page definition) and software instructions (for example, for performing the steps of FIG. 2), to enable digital processing system 800 to provide several features in accordance with the present disclosure. The code/instructions stored in secondary memory 830 may either be copied to RAM 820 prior to execution by CPU 810 for higher execution speeds, or may be directly executed by CPU 810.

Secondary memory 830 may contain hard drive 835, flash memory 836, and removable storage drive 837. Some or all of the data and instructions may be provided on removable storage unit 840, and the data and instructions may be read and provided by removable storage drive 837 to CPU 810. Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 840 or hard disk installed in hard drive 835. These computer program products are means for providing software to digital processing system 800. CPU 810 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 830. Volatile media includes dynamic memory, such as RAM 820. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 850. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method of customizing display of electronic pages based on user interactions, said method being performed at least in part in a digital processing system, said method comprising:

receiving a first request from a user to display an electronic page;

serving said electronic page to said user in response to said first request, wherein said electronic page is according to a specification which contains a first set of interactive elements having a corresponding set of parameter values specifying a corresponding shape and size for each interactive element and the inter-element distances among said first set of interactive elements in the display of said web page on a display screen, wherein each interactive element is displayed in a corresponding element area defined by a respective boundary according to the specified corresponding shape and size on said display screen, wherein said specification specifies a respective utility to be provided upon selection of a corresponding interactive element of said first set of interactive elements, wherein each of said first set of interactive elements is also defined associated with a corresponding padding area surrounding said element area, wherein a selection point in said element area of said first interactive element represents said selection of said first interactive element, wherein a selection point in said padding area of said first interactive element represents a mis-selection of said first interactive element;

receiving monitoring data representing selection points by said user on said electronic page displayed on said display screen, wherein each selection point of a first subset of said selection points is on said element area of a first interactive element of said first set of interactive elements on said display screen constituting said selection of said first interactive element to obtain the utility specified for the first interactive element in said specification, wherein each selection point of a second subset of said selection points is in said padding area of said first interactive element to constitute said mis-selection of said first interactive element, said first interactive element having as neighbors a second set of interactive elements of said first set of interactive elements;

receiving a second request from said user to display said electronic page;

upon a count of selection points in said second subset exceeding a pre-determined threshold, calculating new parameter values specifying increased inter-element distances between said first interactive element and at least one of said second set of interactive elements;

forming a modified specification for said electronic page according to said calculated new parameter values, wherein said modified specification for said electronic page is formed to specify said first interactive element and said second set of interactive elements having said corresponding values for the shape and size of the corresponding element area of each interactive element, but with said new inter-element distances set to said new parameter values respectively; and serving said electronic page based on said modified specification to said user in response to said second request such that all of said first interactive element and said second set of interactive elements in said web page are displayed with same shape and size for the corresponding element areas, as in said electronic page served in response to said first request, but with the new inter-element distances between said first interactive element and said at least one of said second set of interactive elements to cause the distance from said first interactive element to at least one of said second set of interactive elements to increase or decrease corresponding to respective ones of said new parameter values upon display in response to said second request.

2. The method of claim 1, wherein said calculating comprises:

examining said monitoring data for identifying a low value for an inter-element distance between a pair of interactive elements, wherein said inter-element distance is represented by said low value when serving said web page in response to said first request; and calculating a new inter-element distance between said pair of interactive elements, wherein said new inter-element distance is represented by a new parameter value, wherein said new parameter value is higher than said low value, wherein said web page is served with said new inter-element distance between said pair of interactive elements in response to said second request.

3. The method of claim 2, further comprising:

storing said monitoring data in a user profile database, wherein said monitoring data is stored per user per display screen size, wherein one set of values are stored for said inter-element distance and said second set of interactive elements for one display screen size for said user, and another set of values are stored for said inter-element distance and said second set of interactive elements for another display screen size for said user.

4. The method of claim 3, further comprising:

storing default values for said first interactive element and said inter-element distance in said specification of said web page; and storing new respective parameter values computed for corresponding users for inter-element distances between said pair of interactive elements in a second database, wherein said default values for inter-element distance in said specification are overwritten with corresponding new parameter values to form said modified specification before sending said page specification to said user as a response to said second request received from said user.

5. The method of claim 4, wherein said digital processing system is a server system, wherein said display screen is contained in an end user system, wherein said end user system receives said page specification corresponding to said web page from said server system and displays said web page on said display screen, said end user system providing said server system a respective number of selections and respective number of mis-selections associated with each interactive element displayed as a part of said web page, wherein said server system maintains said first database and said second database based on said respective number of selections and said respective number of mis-selections received from said end user system.

6. The method of claim 1, wherein said new inter-element distances comprise a first distance between said first element and a second element, and a second distance between said first element and a third element,
wherein said second element and said third element are comprised in said second set of interactive elements,
wherein said first distance is not equal to said second distance.

7. A non-transitory machine readable medium storing one or more sequences of instructions for enabling a server system to customize display of electronic pages based on user interactions, wherein execution of said one or more instructions by one or more processors contained in said server system enables said server system to perform the actions of:
receiving a first request from a user to display an electronic page;
serving said electronic page to said user in response to said first request, wherein said electronic page is according to a specification which contains a first set of interactive elements having a corresponding set of parameter values specifying a corresponding shape and size for each interactive element and the inter-element distances among said first set of interactive elements in the display of said web page on a display screen, wherein each interactive element is displayed in a corresponding element area defined by a respective boundary according to the specified corresponding shape and size on said display screen, wherein said specification specifies a respective utility to be provided upon selection of a corresponding interactive element of said first set of interactive elements,
wherein each of said first set of interactive elements is also defined associated with a corresponding padding area surrounding said element area,
wherein a selection point in said element area of said first interactive element represents said selection of said first interactive element,
wherein a selection point in said padding area of said first interactive element represents a mis-selection of said first interactive element;
receiving monitoring data representing said selection points by said user on said electronic page displayed on said display screen, wherein each selection point of a first subset of said selection points is on said element area of a first interactive element of said first set of interactive elements on said display screen constituting said selection of said first interactive element to obtain the utility specified for the first interactive element in said specification, wherein each selection point of a second subset of said selection points is in said padding area of said first interactive element to constitute said mis-selection of said first interactive element, said first interactive element having as neighbors a second set of interactive elements of said first set of interactive elements;
receiving a second request from said user to display said electronic page;
upon a count of selection points in said second subset exceeding a pre-determined threshold, calculating new parameter values specifying increased inter-element distances between said first interactive element and at least one of said second set of interactive elements;
forming a modified specification for said electronic page according to said calculated new parameter values, wherein said modified specification for said electronic page is formed to specify said first interactive element and said second set of interactive elements having said corresponding values for the shape and size of the corresponding element area of each interactive element but with said new inter-element distances set to said new parameter values respectively; and
serving said electronic page based on said modified specification to said user in response to said second request such that all of said first interactive element and said second set of interactive elements in said web page are displayed with same shape and size for the corresponding element areas, as in said electronic page served in response to said first request, but with the new inter-element distances between said first interactive element and said at least one of said second set of interactive elements to cause the distance from said first interactive element to at least one of said second set of interactive elements to increase or decrease corresponding to respective ones of said new parameter values upon display in response to said second request.

8. The non-transitory machine readable medium of claim 7, wherein said calculating comprises:
examining said monitoring data for identifying a low value for an inter-element distance between a pair of interactive elements, wherein said inter-element distance is represented by said low value when serving said web page in response to said first request; and
calculating a new inter-element distance between said pair of interactive elements, wherein said new inter-element distance is represented by a new parameter value, wherein said new parameter value is higher than said low value,
wherein said web page is served with said new inter-element distance between said pair of interactive elements in response to said second request.

9. The non-transitory machine readable medium of claim 8, said actions further comprise:
storing said monitoring data in a user profile database, wherein said monitoring data is stored per user per display screen size, wherein one set of values are stored for said inter-element distance and said second set of interactive elements for one display screen size for said user, and another set of values are stored for said inter-element distance and said second set of interactive elements for another display screen size for said user.

10. The non-transitory machine readable medium of claim 9, said actions further comprise:
storing default values for said first interactive element and said inter-element distance in said specification of said web page; and
storing new respective parameter values computed for corresponding users for inter-element distances between said pair of interactive elements in a second database,
wherein said default values for inter-element distance in said specification are overwritten with corresponding new parameter values to form said modified specification before sending said page specification to said user as a response to said second request received from said user.

11. The non-transitory machine readable medium of claim 7, wherein said new inter-element distances comprise a first distance between said first element and a second element, and a second distance between said first element and a third element,
  wherein said second element and said third element are comprised in said second set of interactive elements,
  wherein said first distance is not equal to said second distance.

12. A server system comprising:
  one or more processors; and
  a random access memory (RAM) to store instructions,
  wherein said one or more processors retrieve said instructions and execute said instructions, wherein execution of said instructions causes said server system to perform the actions of:
    receiving a first request from a user to display an electronic page;
    serving said electronic page to said user in response to said first request, wherein said electronic page is according to a specification which contains a first set of interactive elements having a corresponding set of parameter values specifying a corresponding shape and size for each interactive element and the inter-element distances among said first set of interactive elements in the display of said web page on a display screen, wherein each interactive element is displayed in a corresponding element area defined by a respective boundary according to the specified corresponding shape and size on said display screen, wherein said specification specifies a respective utility to be provided upon mere selection of a corresponding interactive element of said first set of interactive elements,
    wherein each of said first set of interactive elements is also defined associated with a corresponding padding area surrounding said element area,
    wherein a selection point in said element area of said first interactive element represents said selection of said first interactive element,
    wherein a selection point in said padding area of said first interactive element represents a mis-selection of said first interactive element;
    receiving monitoring data representing said selection points by said user on said electronic page displayed on said display screen, wherein each selection point of a first subset of said selection points is on said element area of a first interactive element of said first set of interactive elements on said display screen constituting said selection of said first interactive element to obtain the utility specified for the first interactive element in said specification, wherein each selection point of a second subset of said selection points is in said padding area of said first interactive element to constitute said mis-selection of said first interactive element, said first interactive element having as neighbors a second set of interactive elements of said first set of interactive elements;
    receiving a second request from said user to display said electronic page;
    upon a count of selection points in said second subset exceeding a pre-determined threshold, calculating new parameter values specifying increased inter-element distances between said first interactive element and at least one of said second set of interactive elements;
    forming a modified specification for said electronic page according to said calculated new parameter values, wherein said modified specification for said electronic page is formed to specify said first interactive element and said second set of interactive elements having said corresponding values for the shape and size of the corresponding element area of each interactive element but with said new inter-element distances set to said new parameter values respectively; and
    serving said electronic page based on said modified specification to said user in response to said second request such that all of said first interactive element and said second set of interactive elements in said web page are displayed with same shape and size for the corresponding element areas, as in said electronic page served in response to said first request, but with the new inter-element distances between said first interactive element and said at least one of said second set of interactive elements to cause the distance from said first interactive element to at least one of said second set of interactive elements to increase or decrease corresponding to respective ones of said new parameter values upon display in response to said second request.

13. The server system of claim 12, wherein said calculating comprises:
  examining said monitoring data for identifying a low value for an inter-element distance between a pair of interactive elements, wherein said inter-element distance is represented by said low value when serving said web page in response to said first request; and
  calculating a new inter-element distance between said pair of interactive elements, wherein said new inter-element distance is represented by a new parameter value, wherein said new parameter value is higher than said low value,
  wherein said web page is served with said new inter-element distance between said pair of interactive elements in response to said second request.

14. The server system of claim 13, said actions further comprise:
  storing said monitoring data in a user profile database, wherein said monitoring data is stored per user per display screen size, wherein one set of values are stored for said inter-element distance and said second set of interactive elements for one display screen size for said user, and another set of values are stored for said inter-element distance and said second set of interactive elements for another display screen size for said user.

15. The server system of claim 14, said actions further comprise:
  storing default values for said first interactive element and said inter-element distance in said specification of said web page; and
  storing new respective parameter values computed for corresponding users for inter-element distances between said pair of interactive elements in a second database,
  wherein said default values for inter-element distance in said specification are overwritten with corresponding new parameter values to form said modified specification before sending said page specification to said user as a response to said second request received from said user.

16. The server system of claim 12, wherein said new inter-element distances comprise a first distance between said first element and a second element, and a second distance between said first element and a third element, wherein said second element and said third element are comprised in said second set of interactive elements, wherein said first distance is not equal to said second distance.

* * * * *